Patented Aug. 24, 1954

2,687,407

UNITED STATES PATENT OFFICE 2,687,407

PRODUCTION OF RESINS FROM DIALLYLI-DENE PENTAERYTHRITOL AND A POLY-HYDROXY ALCOHOL

Hans Orth, Troisdorf, Germany, assignor to Dynamit-Actien-Gesellschaft vormals Alfred Nobel & Co., Troisdorf (Bez. Koln), Germany No Drawing. Application July 18, 1951,
Serial No. 237,481

8 Claims. (Cl. 260—88.3)

This invention relates to the production of resins and is more particularly concerned with resins produced from unsaturated poly-acetals and poly-hydroxy alcohols.

It has long been known that unsaturated cyclically constructed acetals and ketals of 1:2- and 1:3-alkylene glycols, similar to the unsaturated oxocompounds themselves and the unsaturated carboxylic acids, can be re-acted with compounds with available hydrogen atoms, especially mono-hydroxy and polyhydroxy or their corresponding amines in the presence of appropriate catalysts. (See inter alia German Patent No. 664,271 and Friedlander 25, first half, pages 57 et seq.)

It is also known that by applying this reaction principle to correspondingly constructed spirane-like acetals of suitable poly-hydroxy alcohols, especially using pentaerythritol as a tetrafunctional alcohol, polyaddition products are obtained, which are hardenable at relatively low temperature (80°–90° C.). It has not been proposed, for example in the case of the reaction of pentaerythritol acrolein, to isolate the intermediately formed unsaturated diacetal. The final product is obtained in one stage by introducing the quantities stoichiometrically calculated from the functionality of the reactants, in the reaction water formed in the acetalisation in the first phase being distilled out on completion of the reaction and the viscous resin formed thereafter immediately being poured into suitable moulds for the purpose of hardening. The excess alcoholic groups are added to the unsaturated diacetal with simultaneous cross-linkage (see in this connection H. Schulz and H. Wagner, Angew. Chem. 62, 5, page 117 [1950]). Aromatic or aliphatic sulphonic acids or dialkyl sulphates, or organic acids such as oxalic acid are generally employed as catalysts for this reaction, the latter acid generally reacting very sluggishly. The only apparent disadvantage of this method of working is that the choice of the alcohol is somewhat limited both as regards the properties of the end product and as regards the reaction capacity in the preceding acetalisation, although the possible mixed condensation with different alcohols is described in the aforesaid publication. Moreover, it has been found that if substantially colourless products are desired the reaction must be conducted in the presence of inert gases and the purest starting material must be employed for the alcoholic component.

If, the acetalisation and poly addition are divided into two stages, the procedure affords a number of advantages despite the division of the process into two separate operations: In the first place, there is a wider choice of alcohols especially since it has been found that the most readily reacting alcohol reacts in advance in the single-stage process, if different poly-hydroxy alcohols having different activities are simultaneously introduced, while the alcohol having the more sluggish reaction, for example pentaerythritol, does not react at all or does so only partially. Moreover, with this method of operation, especially when trimethylol propane (1:1:1-trihydroxy methyl propane) is employed as the alcohol, products can be obtained which are far superior in their mechanical strength values to the products obtained on the basis of the single-stage process. Furthermore, the poly-addition products thus obtained are characterised by a substantially reduced water absorption and extremely low shrinkage after hardening. A particular advantage lies in the fact that starting substances of technical quality can be employed for the production of the diacetal, since the doubly unsaturated acetal (for example based on pentaerythritol) can be very readily purified as an initial product and its yield is not so greatly dependent upon the purity of the starting materials.

If it is desired to produce completely crystal-clear colourless cast articles it has been found expedient to employ as catalyst certain complex compounds of boron fluoride, the so-called an-solvo acids or complex halogeno acids, instead of the organic sulphonic acids, since the latter always entail a more or less pronounced yellowing of the cast articles even when the purest starting materials and catalysts are employed. Only a few thousandths of a per cent of the boron fluoride-dihydrate or -dietherate are needed. Similarly, only a like amount of the complex compound of tin chloride and hydrochloric acid is employed, in order to ensure hardening of the poly-addition products in the form of crystal-clear, completely colourless cast articles. The hardening does not take less time and does not require higher temperatures than when sulphonic acids are employed as contacts and is generally completed in about 12 to 15 hours (at 80° C.).

If diallylidene pentaerythritol is employed as the unsaturated component and the already mentioned trimethylol propane is employed as trifunctional alcoholic component, cast articles are obtained under the above conditions, the strength values of which are, as will be seen from Example 1 hereinafter, in some cases higher by 20% to 30% than in the case of a poly addition product based on pentaerythritol alone and produced by the single-stage process.

In all cases, the poly-addition products obtained by the two-stage process, like the polyether acetals obtained by the direct method and in contrast to the cast articles produced by the poly-condensation principle, whether with polyester, phenoplast or aminoplast base, are distinguished by their freedom from blisters and absence of cracking even when stored for a long time in a completely dry atmosphere. If it is desired to colour the cast resins, no difficulty is encountered in doing so by means of suitable colouring substances. A certain percentage of inorganic or organic loading agents, such as kaolin or graphite, may also be incorporated without the hardening rate or strength values appreciably suffering.

In accordance with a further development of the invention, it has been found that, of the mixed primary-secondary poly-hydroxy compounds, the hexa-hydroxy sugar alcohols, such as mannitol, sorbitol and dulcitol, are distinguished by a superior reaction capacity with respect to the said unsaturated diacetals, although these alcohols contain, in addition to the two primary carbinal groups, four secondary alcoholic groups in the molecule, without any activating negative substituents being simultaneously present. The products obtained using the hexa-hydroxy alcohols have generally speaking, better properties than those obtained using other poly-hydroxy alcohols. This is true not only in respect of the brightness of the products, but in respect of their mechanical strength and stability under heat, the latter being higher by 50%–60% than that of the poly-addition products obtained when only the tri and tetravalent alcohols are employed.

*Examples*

1. 212 g. (1 mol.) of diallylidene-pentaerythritol are mixed with 90 g. (0.67 mol.) of trimethylol propane (1:1:1-trihydroxy methyl propane), and fused at about 50° to 60° C. and 1 g. p-toluene (or camphor)-sulphonic acid dissolved in about 1–2 cc. of butyl acetate, is stirred in. After precondensation for about one hour at 70° to 80° C. the slightly yellowish viscous resin is poured into a suitable mould and hardened for 15 to 20 hours at 80° C. The yellowish but clear cast article shows the following values when physically tested:

Bending strength_____ 1055–1060
Impact hardness _____ 65–67 (72)
Notched bar touchness_____ 9.4–10.0
Brinell hardness_____ 940–965
Resistance to deformation:
 According to Martens_____ 55–60 (72)
 Vikat _____ 66–67
Water absorption after 7 days_____ 112 mg. per 100 sq. cm. corresponding to 0.33 per cent.

2. 212 g. (1 mol.) of diallylidene-pentaerithritol are precondensed for about one hour at 70° to 80° C., as described in Example 1, with 90 g. (0.67 mol.) of trimethylol (1:1:1)-propane, 20 to 25 drops of boron fluoride-dihydrate being stirred in, and the viscous resin thus obtained is poured into a mould and hardened at 80° to 85° C. for 20 to 25 hours. The cast article thus obtained, in contrast to that obtained in Example 1, while also being completely transparent, is either entirely colourless, or (according to the hardening time) at the most slightly yellowish, the slight coloration being readily removed by adding traces of suitable blue colouring substances. The values shown by the physical tests differ only slightly from those of the cast article obtained in accordance with Example 1.

3. 106 g. of diallylidene-pentaerythritol are precondensed at 70° to 80° C. as in Example 1 with 45 g. (0.335 mol.) of trimethylol (1:1:1)-propane with the addition of 0.30 g. (about 0.2%) of boron fluoride-acetic acid and thereafter hardened for 15 hours at 80° to 85° C. The cast article thus obtained is either colourless or very slightly yellowish and shows on physical testing approximately the same strength values and heat resistance and the same water absorption with the cast article obtained with p-toluene sulphonic acid as catalyst.

4. 212 g. (1 mol.) of diallylidene-pentaerythritol and 90 g. (0.67 mol.) of trimethylol (1:1:1)-propane are precondensed as in Example 2 by means of boron fluoride-dihydrate and coloured red by the addition of a solution of a suitable red colouring substance in ethyl acetate, according to the hue required. The cast article obtained is completely transparent and has a brilliant red colour.

5. 106 g. (0.5 mol.) of diallylidene-pentaerythritol are precondensed with 1.13 g. of pentaerythritol in the presence of 0.5 g. of p-toluene (or camphor)-sulphonic acid with strong agitation, and as soon as the pentaerythritol has entered into solution, 30 g. of trimethylol propane (corresponding to a ratio of pentaerythritol to trimethylol propane of 1:2 mol. are stirred in. After further stirring for one to two hours at 70° to 80° C. the product is again poured into moulds and hardened at 85° C. for about 15 hours. The values shown by the physical tests of the more or less yellowish cast article obtained lie within about the same limits as those of the cast resin obtained in accordance with Example 1, only the notched bar toughness being somewhat lower (at about 5–6) and the heat resistance (according to Martens) being somewhat higher (10° to 15° C.).

6. 106 g. (0.5 mol.) of diallylidene-pentaerythritol and 40 g. (0.333 mol.) of 1:1:1-trimethylol ethane are precondensed for about three hours at 75° to 80° C. in the presence of 0.5 g. of p-toluene (camphor)-sulphonic acid with strong agitation until either the whole quantity of 1:1:1-trimethylol ethane or at least most of the alcohol has entered into solution. The product is thereafter hardened at 80° C. for about two hours. The strength values and the water absorption and heat resistance of the cast article thus obtained lie substantially between the values of the cast articles obtained on the basis of trimethylol-(1:1:1)-propane and the mixture of trimethylol propane and pentaerythritol (see Examples 1 and 5 respectively).

7. 106 g. (0.5 mol.) of diallylidene-pentaerythritol are mixed with 64.5 g. (0.25 mol.) of 2:3:5:6-tetramethylol-1:4-hydro-quinone-dimethylether, after the addition of 1.5 g. of p-toluene-(or camphor)-sulphonic acid dissolved in 3 cc. of ethyl acetate, and stirred at a temperature of up to 80° C. until all the diether has entered into solution, this taking about 2 to 3 hours.

8. 212 g. of diallylidene-pentaerythritol are precondensed, as described in Example 1, with 90 g. of trimethylol propane in the presence of 1 g. of p-toluene-(or camphor-)-sulphonic acid, 128 g. of kaolin are thereafter stirred in, this corresponding to a content of 30% of loading agent. The product is thereafter hardened in the normal manner and an opaque grey-white cast resin is obtained, where strength values are lower by about 30%–35% than those of the material without a loading agent.

9. A mixture of 106 g. (0.5 mol.) of the diallylidene-pentaerythritol and 45 g. (0.335 mol.) of trimethylol-(1:1:1)-propane are fused on a water bath, 1 g. of tin chloride-hydrochloric acid-hexahydrate (corresponding to 0.75 g. of the anhydrous compound) is stirred in and the product is poured into a mould and hardened as described in Example 2.

10. 424 g. (2 mol) of diallylidene-pentaerythritol are mixed with 180 g. (1.34 mol) of 1:1:1-trihydroxy-methyl propane, the mixture is fused at about 60° C. and 2.5 g. of 2-chlorcymol-5-sulphonic acid dissolved in about 3 cc. of trichloroethylene are stirred in. The further preparation takes place as described in Example 1.

11. 424.5 g. (2 mol) of the diacetal formed from pentaerythritol and acrolein are fused after the addition of 180 g. (1.34 mol) of 2:4-dihydroxy-31-hydroxy methyl pentane on a water bath at 50°–60° C., 2.75 g. of d-camphor-sulphonic acid dissolved in 4 cc. of water are stirred into the fused mass, and the homogeneous mixture is poured into a preheated mould after precondensation for about 15–30 min. and then hardened for about 10 hours at 80° C. According to the degree of purity of the alcohol, a very slightly yellowish to light brown cast resin is obtained, which is substantially equivalent in its mechanical properties to the cast resin obtained in accordance with Example 1.

12. 198.5 g. (0.94 mol) of diallylidene-pentaerythritol are fused at about 60° C. with a mixture of 30 g. (0.14 mol) of hydrobenzoin and 71.5 g. (0.535 mol) of trimethylol (1:1:1)-propane with an addition of 1.5 g. of 2-chlorcymol-5-sulphonic acid, dissolved in the same quantity of water, and when the poly-addition product has reached a suitable viscosity it is cast into a mould preheated to about 50° C. The product is hardened for about 8 hours at 80° C., whereby a yellowish cast article is obtained, which is distinguished from that obtained in accordance with Example 1 by a further improved water-resistance and somewhat increased stability under heat.

13. 212.2 (parts by weight) of diallylidene-pentaerythritol are fused at 60°–70° C. 60.7 (parts by weight) of anhydrous d-sorbitol or 66.7 (parts by weight) of d-sorbitol containing water of crystallisation are introduced, and after the addition of 0.82 (parts by weight) of p-toluene-sulphonic acid (corr. to 0.3 per cent by weight) the mixture is stirred at 70°–80° C. The stirring is continued until all the alcohol has passed into solution and the viscosity suitable for the casing of the resin, which is yellowish to yellowish-brown according to the degree of purity of the starting materials, is reached (about 1–1¼ hours). The resin is thereafter transferred into a mould and hardened for about 20 hours at 80° C. The clear cast article removed from the mould after cooling exhibits the following values on being physically tested:

Bending strength_____ 1570 kg./sq. cm.
Impact hardness _____ 52 cmkg./sq. cm.
Notched bar toughness_____ 3.2 cmkg./sq. cm.
Ball impression hardness:
  10 sec_____ 1390 kg./sq. cm.
  60 sec_____ 1340 kg./sq. cm.
Heat resistance:
  According to Martens_____ 90° C.
  According to Vikat_____ 108° C.
Water absorption:
  After 2 days_____ 98 mg./100 sq. cm.
                                  (corr. to 0.52%)
  After 7 days_____ 200 mg./100 sq. cm.
                                  (corr. to 1.1%)

14. 212.2 (parts by weight) diallylidene-pentaerythritol are reacted with 60.7 (parts by weight) of d-mannitol as described in Example 13, the stirring in this case taking longer (about 1½–2 hours) owing to the lower solubility of the sugar alcohol. After the casting and hardening, which take place under the same conditions as in the aforesaid example, the cast article, which is of darker colour, exhibits, on being physically tested, values which agree approximately with the values of the cast article obtained from sorbitol base.

I claim:

1. Process for the production of casting resins comprising the steps of reacting diallylidene pentaerythritol with at least one polyhydroxy alcohol in the presence of a catalyst of acid nature, said alcohol containing at least two and not more than six hydroxy groups, at least two hydroxy groups being separated from one another by a carbon bridge of at least three carbon atoms.

2. Process as claimed in claim 1, wherein the alcohol is sorbitol.

3. Process as claimed in claim 1, wherein the alcohol is trimethylol propane.

4. Process as claimed in claim 1, wherein the alcohol is trimethylol ethane.

5. Process as claimed in claim 1, wherein the alcohol is trimethylol benzene.

6. Process as claimed in claim 1, wherein the catalyst is the complex compound of stannic chloride and hydrochloric acid.

7. Process as claimed in claim 1, wherein a complex salt of boron fluoride is employed as catalyst.

8. Process as claimed in claim 7, wherein the catalyst is boron fluoride-dihydrate.

References Cited in the file of this patent
FOREIGN PATENTS

| Number | Country | Date |
|---|---|---|
| 664,271 | Germany | Aug. 30, 1938 |

OTHER REFERENCES

Schulze et al., Angewandte Chemie, volume 62, 1950, pp. 105, 113, 114, 117, and 118.